US009275369B2

(12) United States Patent
Salas et al.

(10) Patent No.: US 9,275,369 B2
(45) Date of Patent: Mar. 1, 2016

(54) DEMYSTIFYING OBFUSCATED INFORMATION TRANSFER FOR PERFORMING AUTOMATED SYSTEM ADMINISTRATION

(75) Inventors: Jose' M. Salas, Tracy, CA (US); Steven J. Huey, Castro Valley, CA (US)

(73) Assignee: Oracle International Corporation, Redwood Shores, CA (US)

( * ) Notice: Subject to any disclaimer, the term of this patent is extended or adjusted under 35 U.S.C. 154(b) by 732 days.

(21) Appl. No.: 13/306,256

(22) Filed: Nov. 29, 2011

(65) Prior Publication Data

US 2013/0054771 A1 Feb. 28, 2013

Related U.S. Application Data

(60) Provisional application No. 61/526,912, filed on Aug. 24, 2011.

(51) Int. Cl.
  *G06F 15/173* (2006.01)
  *G06Q 10/10* (2012.01)
  *G06F 9/48* (2006.01)

(52) U.S. Cl.
  CPC ............ *G06Q 10/101* (2013.01); *G06F 9/4843* (2013.01)

(58) Field of Classification Search
  CPC ................... H04L 12/2807; H04L 12/40195; H04L 41/00; G06F 9/3885; G06F 9/4405; G06F 9/50; G06F 9/4843
  USPC .............. 707/2, 602, 634; 709/101, 245, 204, 709/238; 719/330; 718/101
  See application file for complete search history.

(56) References Cited

U.S. PATENT DOCUMENTS

| 5,297,262 | A | 3/1994 | Cox et al. | |
|---|---|---|---|---|
| 5,442,791 | A * | 8/1995 | Wrabetz et al. | 719/330 |
| 5,860,143 | A | 1/1999 | Plakosh et al. | |
| 7,627,736 | B2 | 12/2009 | Stuttard et al. | |
| 7,739,366 | B2 | 6/2010 | Ansari | |
| 7,739,432 | B1 | 6/2010 | Shaw et al. | |
| 2002/0156917 | A1 * | 10/2002 | Nye | 709/238 |

(Continued)

OTHER PUBLICATIONS

Global, Internet Archive Wayback Machine, retrieved from http://web.archive.org/web/20031209063419/http://users.sitestar.net/~efinch/global.html on Jan. 11, 2011, 2 pages.

(Continued)

*Primary Examiner* — Dustin Nguyen
(74) *Attorney, Agent, or Firm* — Kilpatrick Townsend & Stockton LLP

(57) ABSTRACT

Techniques for automating the administration of computer systems. In one set of embodiments, information can be received specifying one or more commands and a list of target computer systems. Upon receiving this information, the one or more commands can be automatically executed in parallel against the target computer systems. In certain embodiments, executing the one or more commands in parallel can include forking a child process for each target computer system, and executing the one or more commands against that target computer system in the context of the child process. Output and error information that is collected by each child process as a result of executing the one or more commands can be aggregated and made available to a system administrator upon completion. Further, error information that is generated as a result of the automated administration process itself can be stored and made available to the system administrator for review.

18 Claims, 7 Drawing Sheets

(56) References Cited

U.S. PATENT DOCUMENTS

| | | | |
|---|---|---|---|
| 2002/0198921 A1* | 12/2002 | Jameson | 709/101 |
| 2003/0120811 A1* | 6/2003 | Hanson et al. | 709/245 |
| 2003/0145050 A1* | 7/2003 | Block et al. | 709/204 |
| 2003/0233571 A1 | 12/2003 | Kraus et al. | |
| 2004/0215398 A1 | 10/2004 | Mixon et al. | |
| 2006/0017969 A1 | 1/2006 | Ly et al. | |
| 2006/0212422 A1* | 9/2006 | Khilani et al. | 707/2 |
| 2006/0265710 A1 | 11/2006 | Ansari | |
| 2007/0130303 A1 | 6/2007 | Anna et al. | |
| 2007/0255829 A1 | 11/2007 | Pecus et al. | |
| 2008/0040564 A1 | 2/2008 | Kubo et al. | |
| 2008/0235686 A1 | 9/2008 | Brenner | |
| 2009/0019538 A1 | 1/2009 | Pandya | |
| 2009/0125907 A1* | 5/2009 | Wen | G06F 9/4843 718/101 |
| 2010/0011372 A1 | 1/2010 | Trensch | |
| 2010/0100624 A1 | 4/2010 | Somogyi et al. | |
| 2010/0154042 A1 | 6/2010 | Miyamoto et al. | |
| 2010/0217849 A1 | 8/2010 | LaForest | |
| 2011/0078108 A1* | 3/2011 | Kumar | 707/602 |
| 2011/0099146 A1* | 4/2011 | McAlister et al. | 707/634 |

OTHER PUBLICATIONS

Global, v1.03—Ed Finch (efinch@newsreal.com), Jun. 1999, 12 pages.

Non-Final Office Action for U.S. Appl. No. 12/393,894 mailed on Oct. 28, 2010, 11 pages.

Final Office Action for U.S. Appl. No. 12/393,894 mailed on Apr. 18, 2011, 11 pages.

U.S. Appl. No. 12/393,894, "Final Office Action", mailed Aug. 22, 2014, 18 pages.

U.S. Appl. No. 12/393,894, "Non Final Office Action", mailed Dec. 23, 2013, 16 pages.

U.S. Appl. No. 12/393,894, "Non-Final Office Action", mailed Mar. 4, 2015, 17 pages.

* cited by examiner

DEMYSTIFYING OBFUSCATED INFORMATION TRANSFER FOR PERFORMING AUTOMATED SYSTEM ADMINISTRATION

CROSS-REFERENCES TO RELATED APPLICATIONS

The present application claims the benefit and priority under 35 U.S.C. 119(e) of U.S. Provisional Application No. 61/526,912 filed Aug. 24, 2011, entitled "DEMYSTIFYING OBFUSCATED INFORMATION TRANSFER FOR PERFORMING AUTOMATED SYSTEM ADMINISTRATION," the entire contents of which are incorporated herein by reference for all purposes.

BACKGROUND

The present disclosure relates in general to system administration, and in particular to techniques for automating the administration of a plurality of computer systems.

Generally speaking, system administrators are charged with maintaining and supporting the computer systems used within an organization or enterprise. For example, a system administrator's responsibilities may include installing/patching/configuring software, monitoring system status information, performing data logging and backups, and the like. Each of these tasks typically requires the system administrator to login to the computer system being administered (either locally or remotely) and execute one or more commands on that system. In a large enterprise with hundreds, or thousands, of computer systems, performing these steps manually with respect to each computer system can be a time consuming and potentially error-prone process. Even with multiple administrators working together, carrying out an administrative task in such a manual manner across a large system deployment can take many hours, if not days, to complete.

BRIEF SUMMARY

Embodiments of the present invention provide techniques for automating the administration of a plurality of computer systems. In one set of embodiments, information can be received specifying one or more commands and a list of target computer systems. The one or more commands can correspond to commands for carrying out one or more administrative tasks with respect to the target computer systems. Upon receiving this information, the one or more commands can be automatically executed in parallel against the target computer systems. In certain embodiments, executing the one or more commands in parallel can include forking a child process for each target computer system, and then executing the one or more commands against that target computer system in the context of the child process. Output and error information that is generated by each child process as a result of executing the one or more commands can be aggregated and made available to a system administrator upon completion. In addition, error information that is generated as a result of the administration process itself can be stored and made available to the system administrator for review.

With the automated administration mechanism described herein, tasks that previously required multiple system administrators multiple hours or days to complete can be carried out by a single administrator in a matter of minutes. In addition, this mechanism can be easily adapted to meet the constraints, requirements, and/or preferences of a particular administrative task, a particular system environment, and/or a particular system administrator. By way of example, input parameters can be specified for controlling, e.g., the total number of child processes than can be forked/active at a given time, the amount of time to wait before a child process is harvested/killed, the formatting of command output and error information, and more.

According to one embodiment, a method performed by an administrator computer system is provided that can comprise receiving a plurality of input parameters including a parameter specifying a plurality of target computer systems (e.g., "host") and a parameter specifying a command to be executed against the plurality of target computer systems (e.g., "command"). The method can further comprise validating the plurality of input parameters and subsequently causing the command to be automatically executed in parallel against the plurality of target computer systems. Once the command has been executed in parallel, output information and first error information generated by teach target computer system as a result of the command execution (e.g., "stdout" and "stderr") can be aggregated and stored. In addition, second error information generated as a result of the processing performed by the administrator computer system (e.g., "stdbad") can also be stored.

In one embodiment, the output information, the first error information, and the second error information can be stored in first, second, and third log files respectively, where the first, second, and third log files are distinct from each other.

In one embodiment, the plurality of input parameters can further include a parameter specifying a directory for storing the first, second, and third log files (e.g., "prefix").

In one embodiment, the plurality of input parameters can further include, inter alia: a parameter specifying a total number of child processes that can be active at once for executing the command in parallel against the plurality of target computer systems (e.g., "fork"), a parameter specifying a period to wait prior to killing existing child processes (e.g., "wait"), a parameter specifying one or more arguments to be used by the command (e.g., "args"), and/or a sixth parameter specifying one or more files to be copied over to each target computer system (e.g., "include" and/or "embody").

In one embodiment, validating the plurality of input parameters can comprise determining whether the "host" parameter specifies a validly formed file or list of target computer systems, and if the "host" parameter does not specify a validly formed file or list, generating an error to be included in the second error information.

In one embodiment, causing the command to be automatically executed in parallel against the plurality of target computer systems can comprise, for each target computer system, validating a status of the target computer system.

In one embodiment, validating the status of the target computer system can comprise attempting to ping the target computer system. If a reply to the ping is not received, a determination can be made whether a maximum number of retries have been attempted. If the maximum number of retries have been attempted, an error can be generated for inclusion in the second error information and the target computer system can be skipped (such that the command is not executed against the target computer system). On the other hand, if the maximum number of retries has not yet been attempted, another attempt can made to ping the target computer system.

In one embodiment, the maximum number of retries can be based on a "retry" parameter included in the plurality of input parameters.

In one embodiment, causing the command to be automatically executed in parallel against the plurality of target computer systems can comprise, for each target computer system, determining whether a current number of active child processes meets or exceeds a maximum number of allowable child processes. If the current number does not meet or exceed the maximum number, a new child process can be forked for the target computer system and the command can be executed against the target computer system in the context of the new child process. On the other hand, if the current number meets or exceeds the maximum number, the administration process can sleep for a period of time and then harvest one or more active child processes before attempting to fork again.

In one embodiment, the maximum number of active child processes can be based on a "fork" parameter included in the plurality of input parameters.

In one embodiment, executing the command against the target computer system in the context of the new child process can comprise determining whether the command should be executed locally or globally. If the command should be executed locally, the command can be executed on the administrator computer system. On the other hand, if the command should be executed globally, the command can be executed on the target computer system.

In one embodiment, the determination of whether the command should be executed locally or globally can be based on a "where" parameter included in the plurality of input parameters.

In one embodiment, the plurality of target computer systems can include more than ten thousand target computer systems.

In one embodiment, the command parameter can specify a UNIX command. In another embodiment, the command parameter can specify a multi-part command.

According to another embodiment of the present invention, a non-transitory computer readable storage medium having stored thereon program code executable by a computer system is provided. The program code can comprise code that causes the computer system to receive a plurality of input parameters including a parameter specifying a plurality of target computer systems (e.g., "host") and a parameter specifying a command to be executed against the plurality of target computer systems (e.g., "command"). The program code can further comprise code that causes the computer system to validate the plurality of input parameters and subsequently cause the command to be executed in parallel against the plurality of target computer systems. Once the command has been executed in parallel, output information and first error information generated by teach target computer system as a result of the command execution (e.g., "stdout" and "stderr") can be aggregated and stored. In addition, second error information generated as a result of the processing performed by the computer system itself (e.g., "stdbad") can also be stored.

According to another embodiment of the present invention, a system is provided. The system can comprise an interface configured to communicatively couple the system with a plurality of target computer systems, and a processor. The processor can be configured to receive a plurality of input parameters including a parameter specifying one or more target computer systems in the plurality of target computer systems (e.g., "host") and a second parameter specifying a command to be executed against the one or more target computer systems (e.g., "command"). The processor can be further configured to validate the plurality of input parameters and subsequently cause the command to be automatically executed in parallel against the one or more target computer systems. Once the command has been executed in parallel, output information and first error information generated by teach target computer system as a result of the command execution (e.g., "stdout" and "stderr") can be aggregated and stored. In addition, second error information generated as a result of the processing performed by the system itself (e.g., "stdbad") can also be stored.

A further understanding of the nature and advantages of the embodiments disclosed herein can be realized by reference to the remaining portions of the specification and the attached drawings.

DETAILED DESCRIPTION

Figure 1:
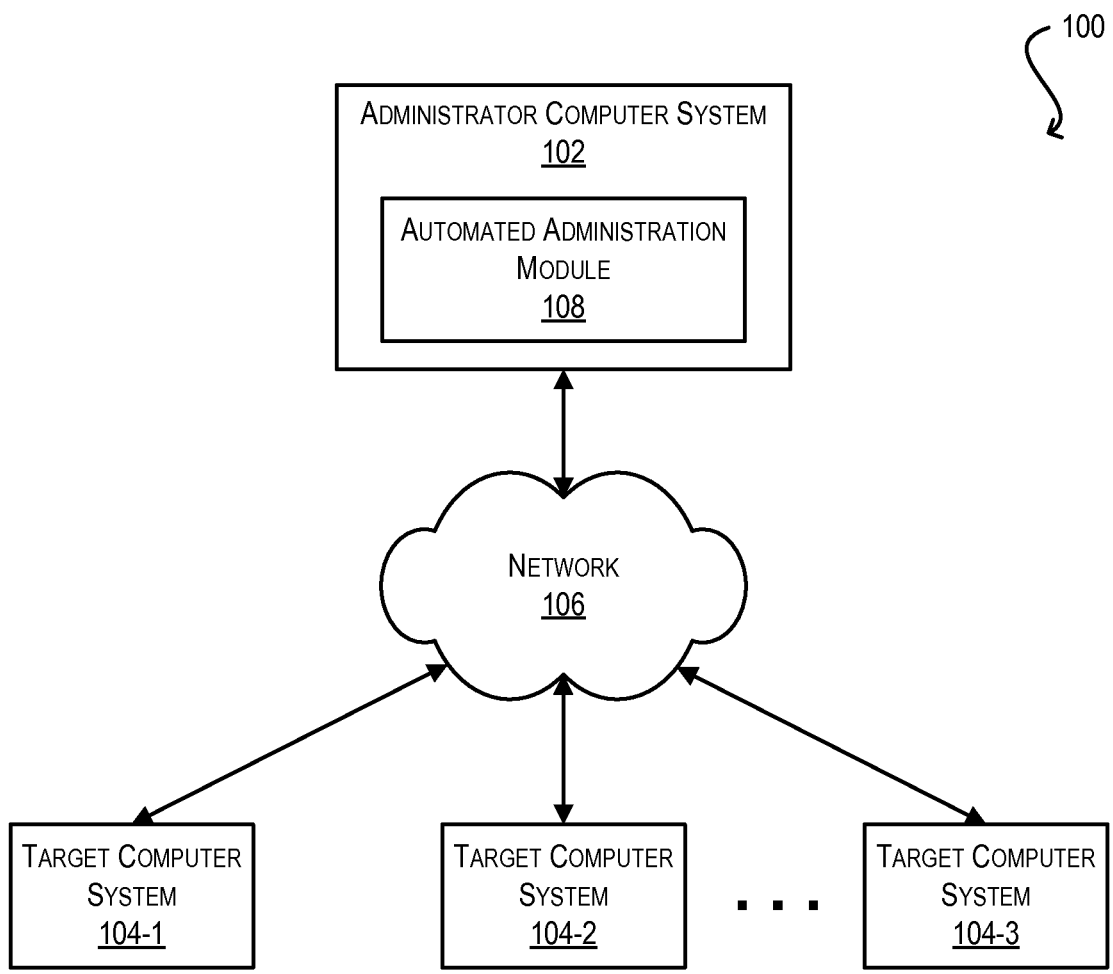
FIG. 1 is a simplified block diagram of a system environment in accordance with an embodiment of the present invention.

In the following description, numerous details are set forth in order to provide an understanding of embodiments of the present invention. It will be apparent, however, to one of ordinary skill in the art that certain embodiments can be practiced without some of these details.

Embodiments of the present invention provide techniques for automating the administration of a plurality of computer systems. In one set of embodiments, information can be received specifying one or more commands and a list of target computer systems. The one or more commands can correspond to commands for carrying out one or more administrative tasks with respect to the target computer systems. Upon receiving this information, the one or more commands can be automatically executed in parallel against the target computer systems. In certain embodiments, executing the one or more commands in parallel can include forking a child process for each target computer system, and then executing the one or more commands against that target computer system in the context of the child process. Output and error information that is generated by each child process as a result of executing the one or more commands can be aggregated and made available to a system administrator upon completion. In addition, error information that is generated as a result of the administration process itself can be stored and made available to the system administrator for review.

With the automated administration mechanism described herein, tasks that previously required multiple system administrators multiple hours or days to complete can be carried out by a single administrator in a matter of minutes. In addition, this mechanism can be easily adapted to meet the constraints, requirements, and/or preferences of a particular administrative task, a particular system environment, and/or a particular system administrator. By way of example, input parameters can be specified for controlling, e.g., the total number of child processes than can be forked/active at a given time, the amount of time to wait before a child process is harvested/killed, the formatting of command output and error information, and more.

For purposes of illustration, certain sections below describe embodiments of the present invention as a computer-executable script (e.g., a Perl script). However, it should be appreciated that embodiments of the present invention are not limited to such an implementation. For example, in some embodiments, the techniques described herein can be implemented as a compiled software application. In other embodiments, the techniques described herein can be implemented entirely in hardware (e.g., in the form of an application-specific integrated circuit (ASIC) or a field-programmable gate array (FPGA)). In yet other embodiments, the techniques described herein can be implemented using a combination of software and hardware. One of ordinary skill in the art will recognize many modifications, variations, and alternatives.

FIG. 1 is a simplified block diagram of a system environment 100 according to an embodiment of the present invention. As shown, system environment 100 can include an administrator computer system 102 and a number of target computer systems 104-1, 104-2, 104-3 that are communicatively coupled via a network 106. Although FIG. 1 depicts one administrator computer system and three target computer systems, any number of these entities can be supported. For example, in certain embodiments, system environment 100 can include tens, hundreds, thousands, tens of thousands, or more target computer systems.

Target computer systems 104-1, 104-2, 104-3 can each be any type of computing device such as a personal computer, a server computer, a network appliance, a laptop computer, a personal digital assistant, a smartphone, a tablet, or the like. In some embodiments, target computer systems 104-1, 104-2, 104-3 can be virtual systems. These virtual systems can behave as if they are independent physical machines and have their own independent identities (e.g., in the form of hostnames, network addresses, and the like). However, these systems can be included in the same physical chassis as one or more other target computer systems, or in the same physical chassis as administrator computer system 102.

Like target computer systems 104-1, 104-2, 104-3, administrator computer system 102 can be any type of computing device. In certain embodiments, administrator computer system 102 can be a computer system that is specifically designated to carry out administrative tasks with respect to system environment 100. In a particular embodiment, administrator computer system 102 can be a "trusted host" such that users of system 102 (e.g., system administrators) can login to any of target computer systems 104-1, 104-2, 104-3 without supplying their passwords.

Network 106 can be any type of data communications network such as a local area network (LAN), a wide-area network (WAN), a virtual network (e.g., VPN), or the Internet. In certain embodiments, network 106 can comprise a collection of interconnected networks.

As shown in FIG. 1, administrator computer system 102 can include an automated administration module 108. In various embodiments, automated administration module 108 can receive input information specifying one or more commands and a list of target computer systems (e.g., systems 104-1, 104-2, 104-3). The one or more commands can correspond to commands for carrying out one or more administrative tasks with respect to the target computer systems. Upon receiving the input information, automated administration module 108 can automatically issue and execute the one or more commands in parallel against the target computer systems. For instance, in one set of embodiments, automated administration module 108 can fork (e.g., using the UNIX fork( ) command) a child process for each target computer system, and then execute the one or more commands against that target computer system in the context of the child process. In this manner, the one or more commands can be executed concurrently (rather than serially) across the target computer systems. Once the commands have been executed, automated administration module 108 can aggregate output and error information that is generated by each child process for each target computer system, and this information can be stored on administrator computer system 102 (or another system or storage device) for review. In certain embodiments, automated administration module 108 can also generate error information that is generated by module 108 itself (rather than by the child processes), and can store this module-specific error information to a separate file for review.

Thus, automated administration module 108 can facilitate the administration of large system deployments (e.g., deployments comprising hundreds, thousands, tens of thousands, or more computer systems) by avoiding the need to manually and serially execute commands against each computer system to carry out a particular administrative task (e.g., installing or patching software, collecting log or backup files, etc.). In addition, automated administration module 108 can be easily configured in various ways per the requirements, constraints, and/or preferences of a given task or user. For example, module 108 can receive input parameters for controlling, e.g., the total number of child processes than can be forked/active at a given time, the amount of time to wait before a child process is harvested/killed, the formatting of command output and error information, and more. The specific processing performed by automated administration module 108, as well as the various parameters that can be used to control its operation, are discussed in greater detail with respect to FIG. 3 below.

In certain embodiments, automated administration module 108 can implemented as a computer program that is interpreted at runtime by a command interpreter (known as a "script"). For instance, automated administration module 108 can be implemented using Perl, Python, Lua, Ruby, Tcl, or any other scripting or dynamic programming language. However, as noted previously, embodiments of the present invention are not so limited. In other embodiments, automated administration module 108 can be implemented as a compiled software application, as a hardware module, or as a combination of software and hardware.

It should be appreciated that system environment 100 is illustrative and is not intended to limit embodiments of the present invention. For example, the various entities depicted in system environment 100 can have other capabilities or include other components that are not specifically described. One of ordinary skill in the art will recognize many variations, modifications, and alternatives.

Figure 2:
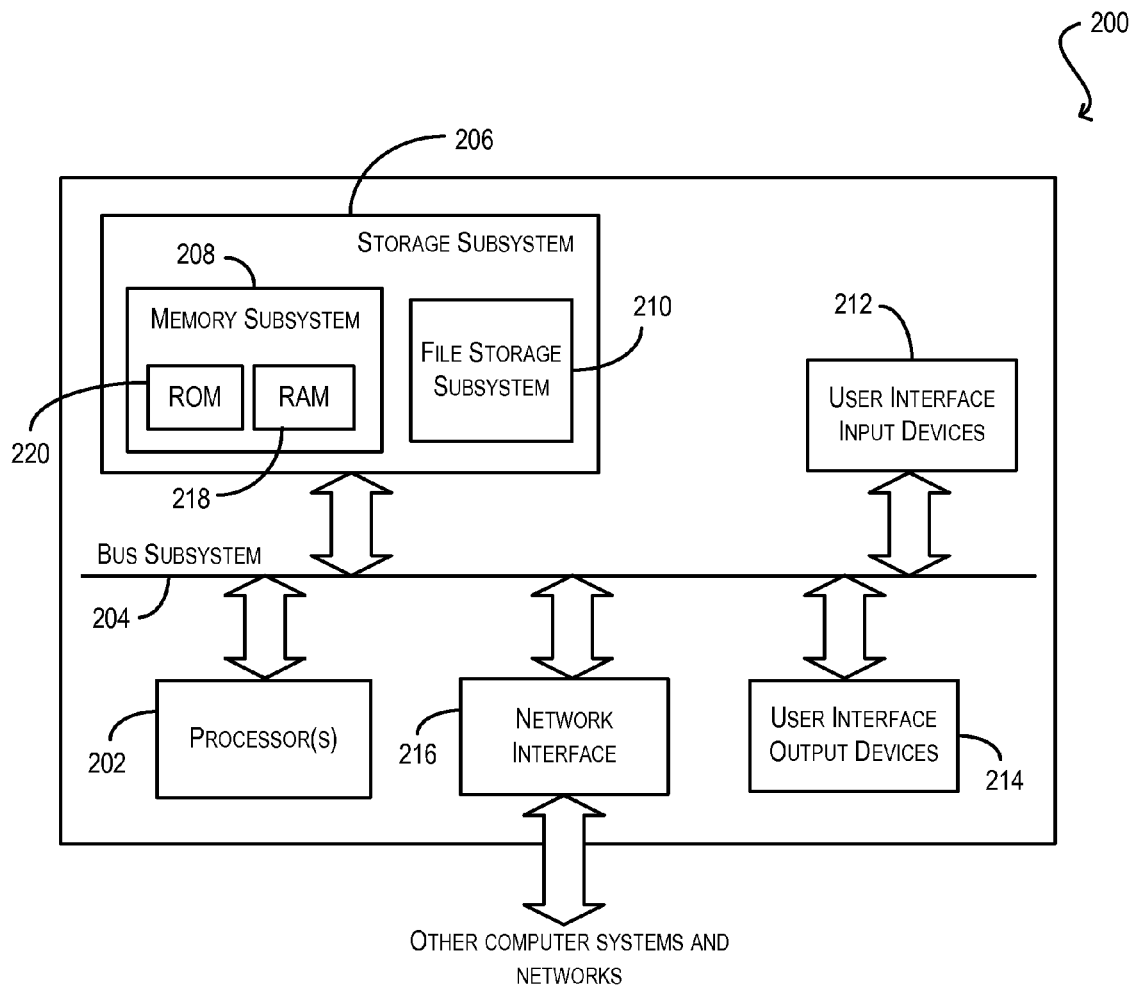
FIG. 2 is a simplified block diagram of a computer system in accordance with an embodiment of the present invention.

FIG. 2 is a simplified block diagram of a computer system 200 according to an embodiment of the present invention. In one set of embodiments, computer system 200 can be used to implement any of the computer systems 102, 104-1, 104-2, 104-3 described with respect to FIG. 1. As shown in FIG. 2, computer system 200 can include one or more processors 202 that communicate with a number of peripheral devices via a bus subsystem 204. These peripheral devices can include a storage subsystem 206 (comprising a memory subsystem 208 and a file storage subsystem 210), user interface input devices 212, user interface output devices 214, and a network interface subsystem 216.

Bus subsystem 204 can provide a mechanism for letting the various components and subsystems of computer system 200 communicate with each other as intended. Although bus subsystem 204 is shown schematically as a single bus, alternative embodiments of the bus subsystem can utilize multiple busses.

Network interface subsystem can 216 serve as an interface for communicating data between computer system 200 and other computer systems or networks (e.g., network 106 of FIG. 1). Embodiments of network interface subsystem 216 can include an Ethernet card, a modem (telephone, satellite, cable, ISDN, etc.), digital subscriber line (DSL) units, and the like.

User interface input devices 212 can include a keyboard, pointing devices (e.g., mouse, trackball, touchpad, etc.), a scanner, a barcode scanner, a touch-screen incorporated into a display, audio input devices (e.g., voice recognition systems, microphones, etc.) and other types of input devices. In general, use of the term "input device" is intended to include all possible types of devices and mechanisms for inputting information into computer system 200.

User interface output devices 214 can include a display subsystem, a printer, a fax machine, or non-visual displays such as audio output devices, etc. The display subsystem can be a cathode ray tube (CRT), a flat-panel device such as a liquid crystal display (LCD), or a projection device. In general, use of the term "output device" is intended to include all possible types of devices and mechanisms for outputting information from computer system 200.

Storage subsystem 206 can include a memory subsystem 208 and a file/disk storage subsystem 210. Subsystems 208 and 210 represent computer-readable storage media that can store program code and/or data that provide the functionality of embodiments of the present invention.

Memory subsystem 208 can include a number of memories including a main random access memory (RAM) 218 for storage of instructions and data during program execution and a read-only memory (ROM) 220 in which fixed instructions are stored. File storage subsystem 210 can provide persistent (i.e., non-volatile) storage for program and data files, and can include a magnetic or solid-state hard disk drive, a floppy disk drive along with associated removable media, an optical drive along with associated removable media (e.g., CD-ROM, DVD, Blu-Ray, etc.), a removable flash memory-based drive or card, and/or other types of storage media known in the art.

It should be appreciated that computer system 200 is illustrative and not intended to limit embodiments of the present invention. Many other configurations having more or fewer components than system 200 are possible.

Figure 3:
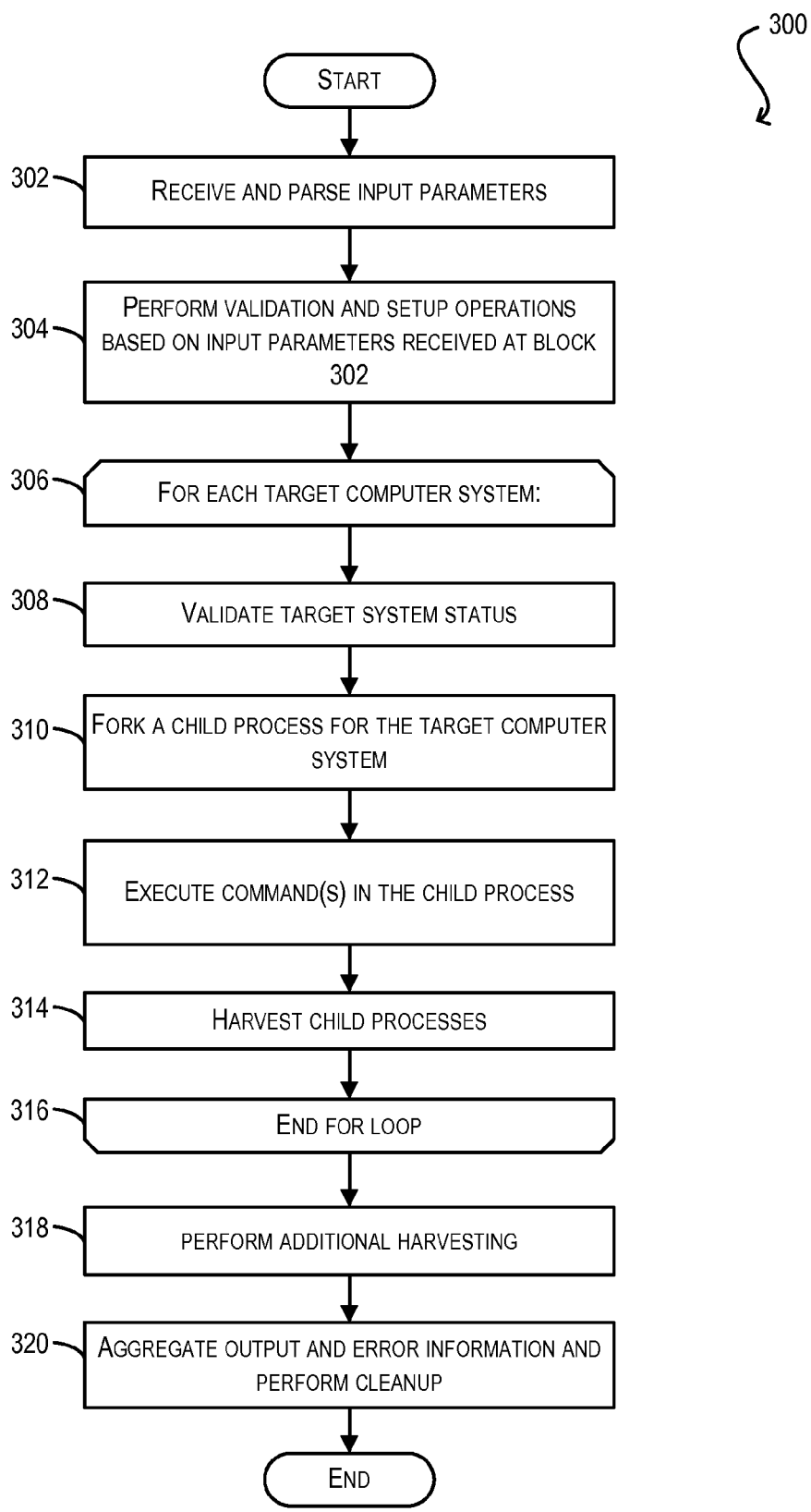
FIG. 3 is a flow diagram of an automated system administration process in accordance with an embodiment of the present invention.

FIG. 3 is a flow diagram of an automated system administration process 300 according to an embodiment of the present invention. In various embodiments, process 300 can be performed by automated administration module 108 of FIG. 1 to automatically execute one or more commands in parallel with respect to a plurality of computer systems (e.g., target computer systems 104-1, 104-2, 104-3). In a particular embodiment, process 300 can be encoded as program code and stored on a non-transitory computer readable storage medium.

Upon being invoked, automated administration module 108 can receive and parse a number of input parameters for controlling the module's execution (block 302). For example, the input parameters can include a parameter specifying one or more commands to be executed, a parameter specifying arguments for the one or more commands, a parameter specifying a filename or list of target computer systems, a parameter specifying the total number of child processes than can be forked/active at a given time, and so on.

In one set of embodiments, automated administration module 108 can be invoked by entering a command identifier (e.g., the module's name) via a command line interface. In these embodiments, the input parameters for module 108 can be specified as options or switches that are appended to the command identifier on the command line. In alternative embodiments, automated administration module 108 can be invoked via a graphical user interface. In these embodiments, the input parameters can be specified via one or more graphical user interface elements or menu options.

The following table provides a exemplary list of input parameters for automated administration module 108 and a brief description of each.

TABLE 1

| | | Input Parameters | | |
|---|---|---|---|---|
| Parameter name | Command line switch | Arguments | Required? | Description |
| command | -c | String | Yes | The command(s) to execute on the target computer systems. In certain embodiments, can default to a predetermined command (e.g., "usr/bin/uptime") if none is specified. |
| args | -a | String | No | Arguments to be passed to the specified command(s). In certain embodiments, can only be used if the "where" parameter is set (i.e., the command(s) are executed locally rather than globally). |
| host | -h | String | No | Filename or list of target computer systems that the specified command(s) will be executed against. In certain embodiments, can default to a predetermined hosts file (e.g., "./HOSTS") if none is specified. |
| jumble | -j | None | No | Jumble up the hosts file/list. |
| unique | -u | None | No | Sort the hosts file/list and remove duplicates. |
| shell | -e | String | No | Operating system shell to use when executing the specified command(s). |

TABLE 1-continued

Input Parameters

| Parameter name | Command line switch | Arguments | Required? | Description |
|---|---|---|---|---|
| | | | | In certain embodiments, can default to a predetermined shell (e.g., "/usr/bin/rsh") if none is specified. |
| fork | -f | Integer | No | Total number of child processes that can be forked and active at a given time. In certain embodiments, can default to a predetermined value (e.g., 50) if none is specified. |
| include | -s | String | No | File(s) to copy over to target computer systems. This file can then be used by the specified command(s). In certain embodiments, can only be used when "where" parameter is not set (i.e., the command(s) are executed globally rather than locally). In further embodiments, this option automatically sets the "fork" parameter to 1 (i.e., only one child process can be forked and active at a time). |
| embody | -q | None | No | When specified, the command(s) specified via the "command" parameter (e.g., shell scripts) are copied over to the target computer systems, but are not executed. Like the "include" parameter, can only be used when "where" parameter is not set (i.e., the command(s) are executed globally rather than locally), and automatically sets the "fork" parameter to 1 (i.e., only one child process can be forked and active at a time). |
| wait | -w | Integer | No | Total number of seconds to wait for each forked child process to die. Once this time period has been exceeded, the process can be killed. In certain embodiments, can default to a predetermined value (e.g., 60) if none is specified. |
| retry | -r | Integer | No | Total number of times to retry pinging a target computer system in the hosts file/list. In certain embodiments, can default to a predetermined value (e.g., 3) if none is specified. |
| where | -z | None | No | If set, the specified command(s) are run locally (i.e., on the computer system where module 108 is invoked). If not set, the specified command(s) are run globally (i.e., on each target computer system). |
| single | -l | None | No | Enables single line, formatted output for output data generated by target computer systems upon execution of specified command(s). |
| brief | -b | None | No | Display brief output on console of administrator computer system. |
| verbose | -v | None | No | Display more verbose output on console of administrator computer system. |
| column | -o | Integer | No | Column in hosts file where target computer system names (i.e., hostnames) are located. |
| prefix | -p | String | No | Filename prefix for standard out and standard error files. |
| temp | -t | String | No | Temp directory where temporary files are written by module 108. In certain embodiments, can default a predetermined file (e.g., "/tmp" if none specified. |
| yes | -y | None | No | If set, module 108 automatically forks a child process for each target |

TABLE 1-continued

Input Parameters

| Parameter name | Command line switch | Arguments | Required? | Description |
|---|---|---|---|---|
| | | | | computer system without prompting for user confirmation. |

As shown above, the list of input parameters can include a "command" parameter for specifying one or more commands to be executed on each target computer system. In one set of embodiments, the specified commands can be UNIX commands that are designed to be performed by a UNIX or UNIX-like operating system (e.g., Solaris, HP-UX, AIX, Linux, BSD, Apple OS X, etc). Alternatively, the specified commands can include any type of command that is recognizable and executable by the operating systems of the target computer systems.

In some embodiments, the commands specified via the "command" parameter can be multi-part commands. For example, the specified commands can be executed in a specific order that is determined by the order in which the commands are listed following the "-c" switch. In further embodiments, the specified commands can include a reference to a batch or script file (e.g., a shell script) that contains a sequence of commands to be executed.

The list of parameters above can also include various other types of parameters that control, for instance, how target computer systems are identified and validated (e.g., via the "host" and "retry" parameters), how the specified commands are issued and executed (e.g., via the "fork," "wait," and "where" parameters), how output and error information is displayed and logged (e.g., via the "single," "brief," "verbose," and "prefix" parameters), and other features. The roles of these parameters are explained in further detail with respect to the remaining steps of process 300 below.

For purposes of illustration, the following is a section of Perl code that may be used by automated administration module 108 for carrying out the parameter parsing of block 302.

```
# Process command-line parameters
GetOptions(
    "single|1",          # -1 - Number 1 (-1)
    "args|a=s",          # -a - Arguments passed (string)
    "brief|b",           # -b - Brief output display - not the regular or verbose
    "command|c=s",       # -c - Command (string)
    "shell|e=s",         # -e - shell (string) (Default is /us/bin/rsh)
    "fork|f=i",          # -f - Fork this number of children (integer)
    "host|h=s",          # -h - Host file to use (string)
    "include|i=s",       # -i -
    "jumble|j",          # -j - Jumble the @Hosts (-j)
    "long|l",            # -l - Long (-l)
    "column|o=i",        # -o - Column (int)
    "prefix|p:s",        # -p - Prefix
    "embody|q",          # -q - embody (-q)
    "retry|r=i",         # -r - Retry Ping (int)
    "temp|t=s",          # -t - Temp dir (string)
    "unique|u",          # -u - Unique the @Hosts (-u)
    "verbose|v",         # -v - Verbose (-v)
    "wait|w=i",          # -w - Wait seconds (int)
    "yes|y",             # -y - Yes, just fork them (-y)
    "where|z",           # -z - Where? Global or Local (-z)
) or die "$me: bad options\n";
# There should be no more arguments
if (scalar @ARGV != 0) {
    print "Bad arguments\n";
    &usage;
} else {
    print "\n";
}
```

Figure 4:
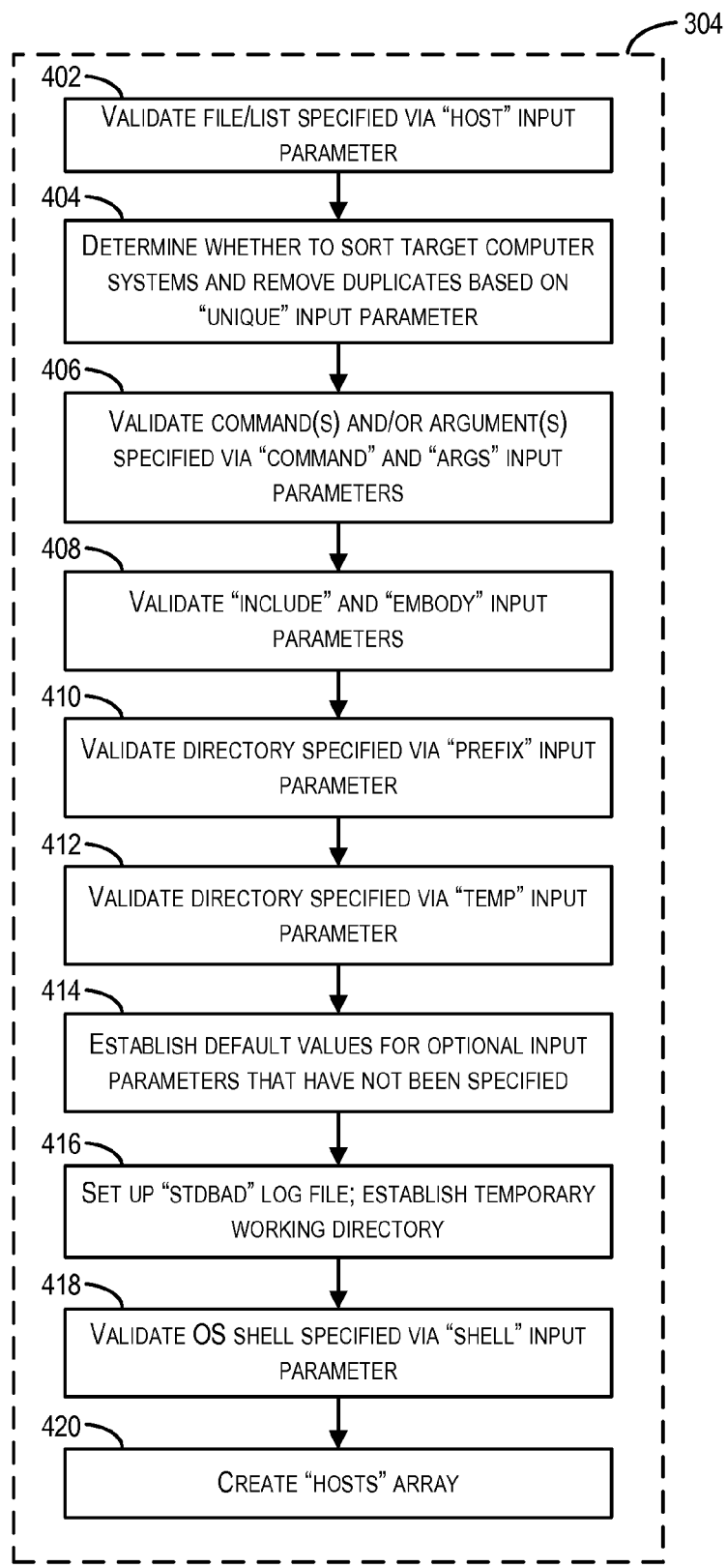
FIG. 4 is a flow diagram of a process for performing validation and setup operations in accordance with an embodiment of the present invention.

Once the input parameters have been received and parsed, automated administration module 108 can perform various validation and setup operations based on the parameters (block 304). FIG. 4 is a flow diagram illustrating steps that can be performed as part of the validation and setup processing of block 304. At block 402, automated administration module 108 can determine whether the string passed with the "host" parameter refers to a valid file or valid comma-delimited list of target computer systems. If not, module 108 can generate an error to be included in a "stdbad" log file (described in further detail below). Further, at block 404, automated administration module 108 can sort the list of target computer systems and remove duplicates if specified by the "unique" parameter. The following is a section of Perl code that may be used by automated administration module 108 for carrying out this processing.

```

# HOSTS Check: $opt_hosts

if ($opt_host) { # is it given to us?
    if ($opt_host ne "-") { # does it have an extra "-"?
        if (-f $opt_host) { # is it a file?
            ;;
        } else {
            # We are hosts on the command line, seperated by commas
            # Split the string by commas, into a ./HOSTS_$$ file
            my @TempHosts = split (/,/, $opt_host);
            open (TEMP_FILE, ">./HOSTS_$$");
            foreach ( @TempHosts ) {
                print TEMP_FILE "$_\n";
            }
            close TEMP_FILE;
            $opt_host = "./HOSTS_$$";
        }
    } else {
        print "-h \"$opt host\" is malformed\n";
        &usage;
    }
} else {
    $opt_host = "./HOSTS";
    if (! -f $opt_host) {
        print "-h \"$opt_host\" does not exist on the command line or is not a regular file (possibly missing?)\n";
        &usage;
    }
}
# Should we sort the $opt_host file?
if ( defined $opt_unique ) {
    print "Using: Unique (-u) Sorting and stripping out duplicate hosts\n";
    my %Unique;
    open HOSTS_SORT, "< $opt_host" or die "Can't open host file $opt_host: $!\n";
    while(<HOSTS_SORT>) {
```

```
    chomp;
    unless ( $Unique{$_}++ ) {
    push( @SortedHosts, $_ . "\n")
    }
  }
  close HOSTS_SORT;
}
print "Using: \"-h $opt_host\"\n";

```

At block 406, automated administration module 108 can validate commands and/or arguments that are specified via the "command" and "args" parameters. In certain embodiments, automated administration module 108 can use a default command (e.g., "/usr/bin/uptime") if no command is specified. However, in these embodiments, a default command may not be used if the "embody" parameter is set. The following is a section of Perl code that may be used by automated administration module 108 for carrying out this processing.

```

#COMMAND Check: $opt_command

if ((defined $opt_embody) || (defined $opt_single))
{
  # We do not change the $opt_command
  if (defined $opt_command)
  {
    ;; # Leave it alone
  } else
  {
    $opt_command = "/usr/bin/uptime";
  }
} else
{
  # This is the "rest" of the Global, Local, etc options
  if (defined $opt_command)
  {
    $opt_command = "echo Executed; $opt_command";
  } else
  {
    $opt_command = "echo Executed; /usr/bin/uptime";
  }
}
print "Using: \"-c $opt_command\"\n";

#ARGUMENTS Check: $opt_args

if ($opt_args) {
  if ($opt_args eq "-") {
    print "\nArguments must be specified with -a \"-x -y -z foobar\" options\n";
    &usage;
  }
  $args = $opt_args;
} else {
  $args = "";
}

```

At block 408, automated administration module 108 can validate the "include" and "embody" parameters. As noted in Table 1 above, the "include" parameter can specify one or more files to be copied over to the target computer systems. These copied files can be accessed at the target computer systems during command execution. Further, the "embody" parameter can specify that one or more commands identified via the "command" parameter (e.g., shell scripts, etc.) are to be copied over to the target computer systems without being executed. In order to validate these parameters, automated administration module 108 can check whether a valid "include" file has been provided, and can check whether the "embody" parameter has been used in conjunction with the "include" parameter. Module 108 can also restrict the total number of active child processes to one if the "embody" and "include" parameters have been specified. The following is a section of Perl code that may be used by automated administration module 108 for carrying out this processing.

```

#INCLUDE Check: $opt_include

if (defined $opt_include) {
  if ($opt_include ne "-") {
    if (! -f $opt_include) {
      print "$opt_include is not a regular file\n";
      &usage;
    }
  }
  $opt_fork = 1;
}

#EMBODY Check: $opt_embody
if ( defined $opt_embody ) {
  if ( not defined $opt_include ) {
    print "-q (embody): You must also specify \"-i ./FILE\"\n";
    &usage;
  }
  $opt_fork = 1;
}

```

At block 410, automated administration module 108 can determine whether the string provided with the "prefix" parameter identifies a valid directory, and whether the directory is writable. Upon validating the "prefix" string, automated administration module 108 can inform the administrator (via., e.g., a console of administrator computer system 102) that three types of log files ("stdout," "stderr," and "stdbad") will be written to the directory path and filename specified by the "prefix" string. The following is a section of Perl code that may be used by automated administration module 108 for carrying out this processing.

```

#PREFIX Check: $opt_prefix
# Should we write results
to a file?
# Yes
$opt_prefix = "./RESULTS" unless $opt_prefix;
if (defined $opt_prefix) {
  $prefix_dirname = dirname($opt_prefix);
  if (! -d $prefix_dirname) {
    print "$opt_prefix is not a directory\n";
    &usage;
  } elsif (! -w $prefix_dirname) {
    print "$opt_prefix is not writable\n";
    &usage;
  }
  if (-e "$opt_prefix.stdout") {
    print "Using: OUTPUT in $opt_prefix.stdout (will be overwritten)\n";
  }
  if (-e "$opt_prefix.stdbad") {
```

```
        print "Using: BAD in $opt_prefix.stdbad (will be
        overwritten)\n";
    }
    if (-e " $opt_prefix.stderr") {
        print "Using: ERRORS in $opt_prefix.stderr (will be
        overwritten)\n";
    }
}

```

At block 412, automated administration module 108 can determine whether the string provided with the "temp" parameter identifies a valid directory, and whether the directory is writable. As noted above, the "temp" parameter specifies a directory for writing temporary files used by automated administration module 108 during execution. In situations where a large of amount of temporary data is likely to be written, the "temp" parameter can be used to specify a storage location with adequate storage capability (e.g., networked storage) if local disk storage on administrator computer system 102 is not adequate. The following is a section of Perl code that may be used by automated administration module 108 for carrying out this processing.

```

#TEMP Check: $opt_temp

# Where is the /tmp dir? - for the staged processes?
if ( defined $opt_temp ) {
    $Temp = $opt_temp;
} else {
    $Temp = "/tmp";
}
my $temp_dirname = dirname($Temp);
if (! -d $temp_dirname) {
    print "Temp dir ($temp_dirname) is not a directory\n";
    &usage;
} elsif (! -w $temp_dirname) {
    print "Temp dir ($temp_dirname) is not writable\n";
    &usage;
}

```

At block 414, automated administration module 108 can establish default values for various parameters that have not been specified (e.g., the "column," "wait," "where," and "retry" parameters), and providing information to the administrator indicating which output/display parameters (e.g., the "single," "brief," and "verbose" parameters) are active. For example, the "single" parameter can cause the first line of output from each command execution (on each target computer system) to be captured and logged by automated administration module 108. This can be useful if, for example, the system administrator is only interested in the information contained in that first line (e.g., a success or failure condition) and does not want to log the remainder of the command output. The following is a section of Perl code that may be used by automated administration module 108 for carrying out this processing.

```

# Set default values for parameters that were not specified

$opt_column = 1 unless $opt_column;
$opt_long = 0 unless $opt_long;
$opt_wait = 500 unless $opt_wait;
print "Using: $opt_wait seconds before killing the child process\n";
$where = "-z" if ($opt_where);
$Count = 1;
$opt_jumble = undef unless $opt_jumble;
#$opt_retry = 3 unless $opt_retry;
if ((defined $opt_retry) && ($opt_retry == 0))
{
    print "Ping Retries: $opt_retry - No Ping will be attempted\n";
    undef $opt_retry;
} else
{
    $opt_retry = 3 unless $opt_retry;
    print "Ping Retries: $opt_retry\n";
}
if (defined $opt_single)
{
    print "Using: -1 (single) option - Will place stdout on the same line as
    the host\n";
}
# Make output unbuffered if the Display is Brief
if (defined $opt_brief){
    print "Output: Buffered (will be sporadic - but quicker) AND your
    terminal may freeze a few seconds\n";
} else {
    $ | = 1;
    print "Output: Unbuffered (will be sequential)\n";
}
```

At block 416, automated administration module 108 can setup a log file for capturing errors generated by automated administrator module 108 (e.g., the "stdbad" file mentioned with respect to the "host" and "prefix" parameters), and establish a temporary working directory. For instance, the "stdbad" log file may be used to capture error information pertaining to a malformed hosts file (per block 402 above), invalid input parameters, or the like. In certain embodiments, the "stdbad" log file will not include any error information generated as a result of executing commands on target computer systems; that error information is piped to a separate "stderr" file that is maintained for each child process (described in further detail below). By capturing error information using separate "stderr" and "stdbad" files. a system administrator easily determine whether a given error was thrown as a result of executing the specified commands against a target computer system or by module 108 itself. The following is a section of Perl code that may be used by automated administration module 108 for carrying out this processing.

```
#select STDERR; $|=1;
select STDERR;
select STDOUT;
# Setup stdbad
$stdbad="$opt_prefix.stdbad";
open BAD_STD, "> $stdbad" or die "Can't open stdbad ($stdbad). $!\n";
close BAD_STD;
# Catch some signals
$SIG{'HUP'}    = "catch_signals";
$SIG{'INT'}    = "catch_signals";
$SIG{'TERM'}   = "catch_signals";
# The list of signals to be sent
@signals = (15, 9);
#@signals = (9, 15);
# Temp directory for output files
$temp_dir="$Temp/$me.$$";
mkdir $temp_dir, 0700 or die "Can't create temp directory
$temp_dir: $!\n";
print "Using: $temp_dir used for \"Temp Files\"\n";

```

At block 418, automated administration module 108 can determine whether the string passed with the "shell" parameter specifies a valid operating system shell (e.g., ssh, telnet, rsh, etc.), and if not, can generate an error for inclusion in the "stdbad" log file. In certain embodiments, automated administration module 108 can use a default shell (e.g., "/usr/bin/rsh") if no shell is specified. The following is a section of Perl code that may be used by automated administration module 108 for carrying out this processing.

```
# Find the appropriate remote-shell program
if ($opt_shell) {
    $rsh = $opt_shell;
} else {
    $rsh = "/usr/bin/rsh";
}
print "Using: $rsh will be used to create remote processes\n";
```

At block 420, automated administration module 108 can create a "hosts" array based on the target computer systems specified via the "host" parameter. This hosts array will be used for later processing. Automated administration module 108 can also jumble the hosts array if so specified by the "jumble" parameter. This jumbling can be useful if, for example, certain groupings of systems in the hosts file are relatively "close" to each other on the network topology. By jumbling the order of these systems, network congestion and contention can be reducing by "spreading out" the concurrent execution of commands across topologically distant systems. This jumbling can be performed using any type of algorithm known in the art. In a particular embodiment, the jumbling can be performed using a fisher-yates shuffle.

Once the hosts array has been generated and the entries in the array have been jumbled, the value of the "fork" parameter can be set to the size of the array (if no "fork" parameter value was specified). The following is a section of Perl code that may be used by automated administration module 108 for carrying out the foregoing processing.

```
##############
# HOSTS: Setup

$longest_host_len=0;
if  ($opt_host eq "-") {
    # Don't prompt
    $opt_yes = 1;
    *HOSTS = *STDIN;
} else {
    open HOSTS, $opt_host or die "Can't open host file $opt_host: $!\n";
}
while (<HOSTS>) {
    chomp($_);
    @fields=split /\s+/, $_;
    if  (defined $fields[$opt_column – 1]) {
        push @hosts, $fields[$opt_column – 1];
        # Save the length of the longest host
        $len = length($fields[$opt_column – 1]);
        if  ($len > $longest_host_len) {
            $longest_host_len = $len;
        }
    }
}
close HOSTS if ($opt_host ne "-");
$orig_hosts = $#hosts + 1;
# Process each host - get the Sorted Hosts -- if "-u"
if ( @SortedHosts )
{
    @hosts = @SortedHosts;
}
# Should we scramble (randomize) - jumble the @hosts?
if ( defined $opt_jumble ) {
    # Jumble them up!
    fisher_yates_shuffle ( \@hosts );
    print "Using: Jumbled Option \"-j\" - Scrambling the HOSTS file\n";
}
# Are there any hosts to process?
$num_hosts = scalar(@hosts);
$Len_Count = length ( $num_hosts );
if ($num_hosts == 0)  {
    print "No hosts were found in column $opt_column of $opt_host\n";
    exit 1;
} else {
    print "Start: There are $num_hosts host(s) to process [origionally: ${orig_hosts}]\n";
}
# Immediately fork a process for each host unless a limit was specified on
# the command-line
$opt_fork=$num_hosts unless $opt_fork;

# Fisher Yates Shuffle - for randomizing the Hosts

sub fisher_yates_shuffle {
    my $deck = shift;   # $deck is a reference to an array
    my $i = @$deck;
    while ($i--) {
        my $j = int rand ($i+1);
        @$deck[$i,$j] = @$deck[$j,$i];
    }
}
```

Figure 5:
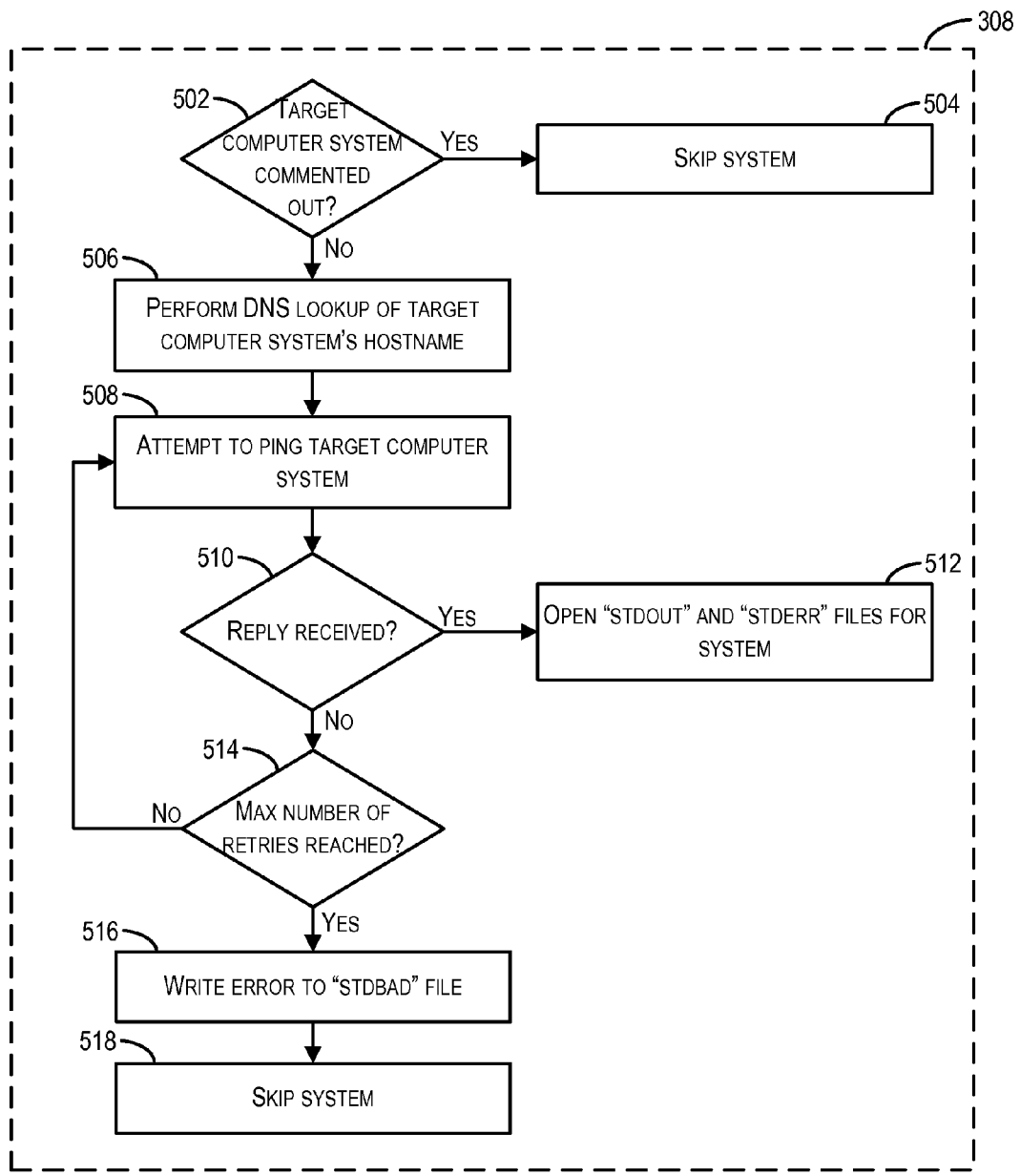
FIG. 5 is a flow diagram of process for validating a status of a target computer system in accordance with an embodiment of the present invention.

Once all of the validation and setup operations described in FIG. 4 have been completed, control can return to process 300 of FIG. 3, where automated administration module 108 can enter a FOR loop for each target computer system in the hosts array (block 306). Within this FOR loop, module 108 can validate the status of the current target computer system (block 308). FIG. 5 is a flow diagram illustrating steps that can be performed as part of the validation processing of block 308. As shown in FIG. 5, automated administration module 108 can first determine whether the current target computer system has been commented out in the original hosts file and thus should not be processed (block 502). If the current target computer system has been commented out, the system can be skipped and the FOR loop in process 300 can move on to the next system in the hosts array (block 504).

Otherwise, automated administration module 108 can perform a domain name lookup of the target computer system's hostname and attempt to ping the target computer system (blocks 506, 508). If the target computer system does not reply to the ping, the ping can be retried a number of times based on the "retry" parameter (blocks 510, 514). If the target computer system still does not reply after the "retry" number of times, an error message can be written to the "stdbad" log file and the system can be skipped (blocks 516, 518).

On the other hand, if the target computer system does reply to the ping attempt, automated administration module 108 can open "stdout" and "stderr" log files for the target computer system in preparation for executing commands against the system (block 512). In various embodiments, the stdout log file can be used to capture output information that is generated as a result of the command execution, while the "stderr" log file can be used to capture error information that is generated as a result of the command execution. As noted above, this "stderr" log file is distinct from the "stdbad" log file, which is configured to solely capture errors generated by module 108 itself. The following is a section of Perl code that may be used by automated administration module 108 for carrying out the foregoing processing.

```
# Process each host
foreach $host (@hosts) {
  chomp $host;
  $percent = ($cnt/$num_hosts) *100;
  print " <-- Section: $percent% Spawned $cnt hosts --> \r" if ($percent <
100);
  print " <-- Section: $percent% Spawned $cnt hosts -->              \n" if
($percent == 100);
  $cnt++;
# Is this a valid host - if it has a # at the beginning - skip it

  open BAD_STD, ">> $opt_prefix.stdbad" or die "Can't open
stdbad($stdbad). $!\n";
  if ( $host =~ /#/ ) {
    print "\t!($Count) \"$host\" - name not valid - Skipped.\n";
    print BAD_STD "# $host COMMENTED - SKIPPED\n";
    $Count++;
    push (@completed_hosts, $host);
    $bad_cnt++;
    next;
  }
  close BAD_STD;

# Should we prompt the user before processing each host?
  if (! $opt_yes) {
    my($choice);   # user input
    print "Launch a process for $host?  (\".\" to quit) [n] ";
    $choice = <STDIN>;
    chop $choice;
    if ($choice eq ".") {
      last;
    }
    if ($choice ne "y" && $choice ne "yes") {
      next;
    }
  }
# Validate the host via DNS
  open BAD_STD, ">> $opt_prefix.stdbad" or die "Can't open
stdbad($stdbad). $!\n";
  if ( ! gethostbyname($host) ){
    print "\n\t!($Count) \"$host\" - DNS name not valid - Skipped.\n";
    print BAD_STD "# $host UNRESOLVED - SKIPPED\n";
    $Count++;
    $bad_cnt++;
    push (@completed_hosts, $host);
    next;
  }
  close BAD_STD;
# Let's ping the host $opt_retry times
  open BAD_STD, ">> $opt_prefix.stdbad" or die "Can't open
stdbad($stdbad). $!\n";
  if (defined $opt_retry)
  {
    my $retry_ping_success = "Failed";
    my $retry_number = 0;
    my $ping_interval = .6;
    my $ping_increment = .2;
    my $ping_total = 0;
    while ($retry_number <= $opt_retry)
    {
      my $host_pingable = Net::Ping->new("icmp");
      if ( $host_pingable->ping($host, $ping_interval) ) {
        $retry_number = $opt_retry + 1;
        $retry_ping_success = "Success";
      } else {
        $retry_number++;
        $ping_interval = $ping_interval + $ping_increment;
        $ping_total += $ping_interval;
      }
      $host_pingable->close( );
    }
    if ($retry_ping_success eq "Failed")
    {
      print "\n\t!($Count) \"$host\" - PING failed after $opt_retry
attempts ($ping_interval seconds) - Skipped.\n";
      print BAD_STD "# $host NOTPINGABLE - SKIPPED\n";
      $Count++;
      $bad_cnt++;
      push (@completed_hosts, $host);
      next;
    }
  }
```

```
  }
  close BAD_STD;
# Setup the stderr file for the new child
  $stderr="$temp_dir/$host.stderr";
# Put a header in the stderr file - YIKES_CHILD
  open ERR, "> $stderr" or die "ERROR: Can't open stderr ($stderr) for
$host: $!\n" && print STDOUT "\nYIKES_CHILD!\n";
  print ERR "# $host\n";
  print ERR "\n";
  close ERR;
# Setup the stdout file for the new child
  $stdout="$temp_dir/$host.stdout";
# Put a header in the stdout file    && print STDOUT
"\nYIKES_CHILD_2!\n" open OUT, ">$stdout"
  or die "ERROR_YIKES_CHILD_2: Can't open stdout
($stdout) for $host: $!\n";
  if   ($opt_single) {
    printf OUT "# %-${longest_host_len}.${longest_host_len}s    ",
$host;
  } else {
    print OUT "###############\n";
    print OUT "# $host\n";
    print OUT "###############\n";
    print OUT "\n";
  }
  close OUT;
```

Figure 6:
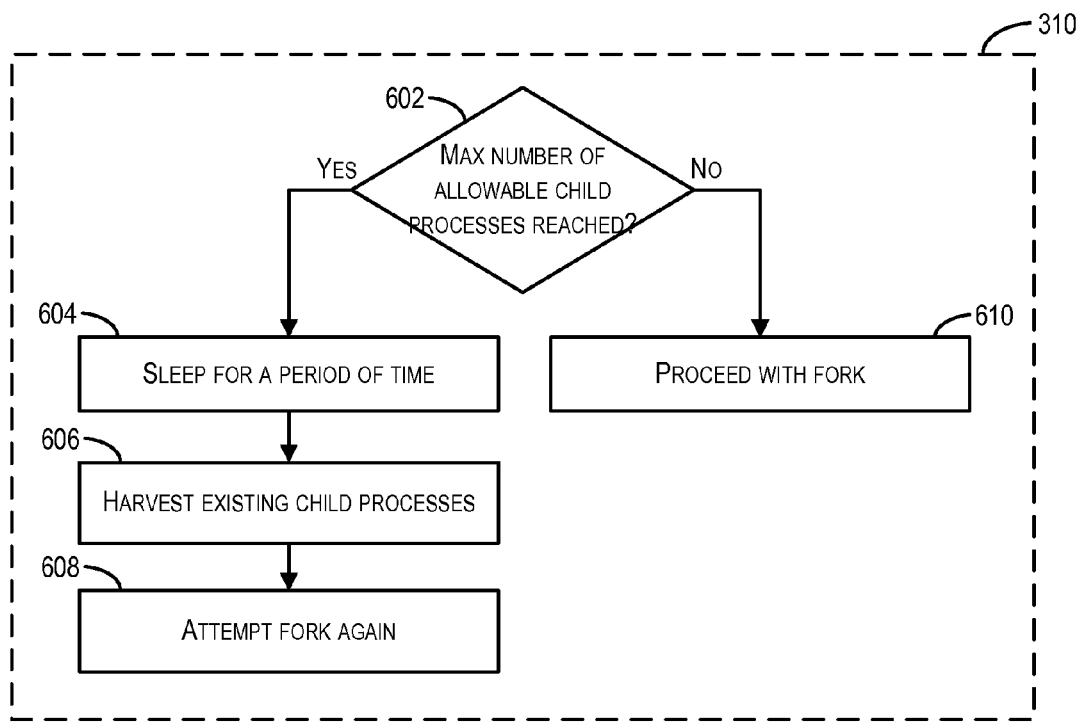
FIG. 6 is a flow diagram of a process for forking a child process for a target computer system in accordance with an embodiment of the present invention.

Returning to process 300 of FIG. 3, at block 310 automated administration module 108 can attempt to fork a new child process for the current target computer system. FIG. 6 is a flow diagram illustrating steps that can be performed as part of the fork processing of block 310. As shown in FIG. 6, automated administration module 108 can first determine whether the maximum number of forked/active child processes (as defined by the "fork" parameter) has been reached (block 602). If the maximum number of forked/active child processes has been reached, module 108 can sleep for a period of time, harvest existing child processes, and then attempt the fork again (blocks 604, 606, 608). The harvesting process is described in further detail with respect to block 314 of FIG. 3 below.

If the maximum number of forked/active child processes has not been reached, automated administration module 108 can proceed with forking the child process (block 610). Control can then return to block 312 of FIG. 3, where the one or more commands specified by the "command" parameter can be executed against the target computer system in the context of the newly forked child process. Since each child process is considered a separate process or thread of execution, this forking mechanism essentially enables automated administration module 108 to execute the specified commands against multiple target computer systems in parallel, thereby substantially reducing the amount of time needed to execute the commands across a large system deployment. The "fork" parameter can be used to ensure that the total number of concurrent child processes does not exceed the memory or processing capabilities of the system on which module 108 is run (e.g., administrator computer system 102).

Figure 7:
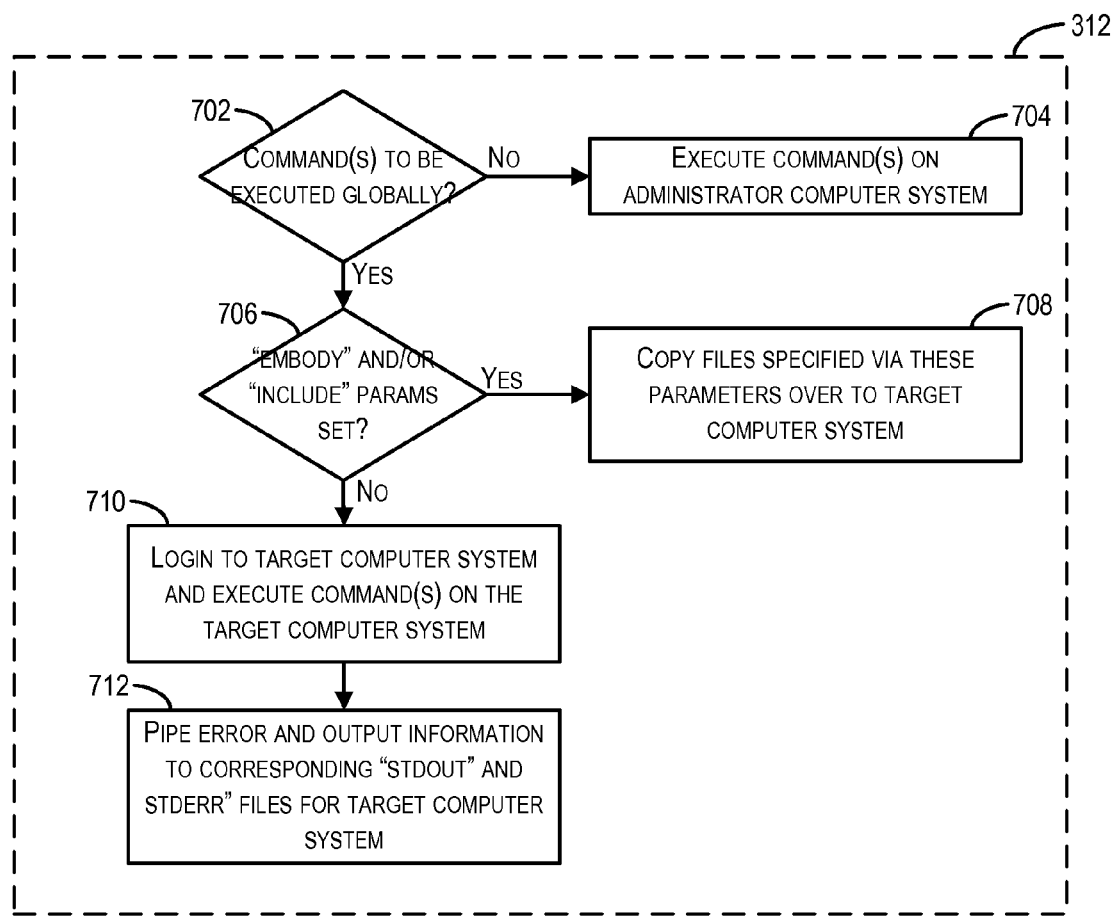
FIG. 7 is a flow diagram of a process for executing a command, in the context of a child process, against a target computer system in accordance with an embodiment of the present invention.

FIG. 7 is a flow diagram illustrating steps that can be performed as part of the command execution processing of block 312. At block 702, automated administration module 108 can determine whether the commands are to be executed globally (i.e., on the target computer system) or locally (i.e., on the administrator computer system) as defined by the "where" parameter. In situations where the commands are processor-intensive and where the target computer system does not have much CPU power, it may be preferable to execute the commands locally. On the other hand, in situations where the commands are not particularly processor-intensive and where the target computer system has ample CPU power, it may be preferable to execute the commands globally.

If the one or more commands are to be executed locally, automated administration module 108 can execute the commands against administrator computer system 102 (block 704). As part of this processing, module 108 can take into account any command arguments specified using the "args" parameter.

If the one or more commands are to be executed globally, automated administration module 108 can determine whether the "embody" and/or "include" parameters have been set (block 706). If so, the files specified with these parameters can be copied over to the target computer system, without executing any commands on the target computer system (block 708). If the "embody" and "include" parameters have not been set, module 108 can login to the target computer system and execute the specified commands against the target computer system (block 710). Further, any output and error information generated by this command execution can be piped to the corresponding "stdout" and "stderr" log files for the target computer system (block 712).

The following is a section of Perl code that may be used by automated administration module 108 for carrying out the forking and command execution processing described above.

```
# Fork and exec the new child
   FORK: {
    # Don't fork too many processes
    if ($num_children == $opt_fork) {
       # Indicate that we aren't forking at the moment
       print "Z";
       $paused = 1;
       # Wait for some children to die
       sleep 1;
       # Harvest some children
       &harvest;
       # Try to fork again
       redo FORK;
    }
    if ($pid = fork) # Fork away the parent
    {
       $start_time{$pid}=time( ); # Note when we started
       # $opt_brief is for outpt display
       if (defined $opt_brief)
       {
          print ".";
       } else
       {
          say(sprintf("%-${Len_Count}.${Len_Count}s of %-${Len_Count}.${Len_Count}s %-${longest_host_len}.${longest_host_len}s - forked ok. Start: %s, PID: %d\n",
             $Count, $num_hosts, $host, scalar localtime $start_time{$pid}, $pid));
       }
       # This is the parent
       $hostname{$pid}=$host;
       $stdout{$pid}=$stdout;
       $stderr{$pid}=$stderr;
       $stdbad{$pid}=$stdbad;
       $stderr_sizes{$pid}   = -s $stderr;   #This is the initial file size
       $stdout_sizes{$pid}   = -s $stdout;   #This is the initial file size
       $stdbad_sizes{$pid}   = -s $stdbad;   #This is not used yet
       $fork_order{$pid}=++$fork_cnt;
       # Count the number of children
       ++$num_children;
       # Save some stuff about the child
       $Child{$pid}=$Count;
       ++$Count;
    } elsif (defined $pid)
    {
       # This is the child bieng spawned
       if ($where)
       {
```

```
          # This is the "local" command
          if (defined $args) {
             exec("/bin/sh",'-c',"('$opt_command' $args $host >> $stdout) 2>> $stderr") ||
                say(sprintf("\nERROR: %-${longest_host_len}.${longest_host_len}s - exec( ) failed: $!\n", $host));
          } else {
             exec("/bin/sh",'-c',"('$opt_command' $host >> $stdout) 2>> $stderr") ||
                say(sprintf("\nERROR: %-${longest_host_len}.${longest_host_len}s - exec( ) failed: $!\n", $host));
          }
       } else
       {
          # This is the special "global" command
          if ( defined $opt_embody ) {
             # - We have a special case (-q = Embody option)
             exec ("/bin/sh",'-c',"((/bin/rcp -p $opt_include '$host:/tmp/$opt_include' >> $stdout) 2>> $stderr; (/bin/rcp -p $opt_command '$host:/tmp/$opt_command' >> $stdout) 2>> $stderr)") ||
                say(sprintf("\nERROR:%-${longest_host_len}.${longest_host_len}s - exec( ) failed: $!\n", $host));
             $opt_embody = undef;
             $opt_include = undef;
          } elsif ( defined $opt_include ) {
             # - We have the include option
             print "\tInclude Option\n";
             exec ("/bin/sh",'-c',"((/bin/rcp -p $opt_include '$host:/tmp/$opt_include' >> $stdout) 2>> $stderr; ($rsh $host '$opt_command' >> $stdout) 2>> $stderr)") ||
                say(sprintf("\nERROR: %-${longest_host_len}.${longest_host_len}s - exec( ) failed: $!\n", $host));
          } elsif (( defined $opt_shell ) and ( $opt_shell eq "/bin/sshexpect" )) {
             #} elsif ( $opt_shell eq   "/bin/sshexpect" ) {
             # This is a special case - used for Secure Connections
             # We make an exception and use -a ($args) for this
             exec("/bin/sh",'-c',"($rsh -h $host $args -c '$opt_command' >> $stdout) 2>> $stderr") ||
                say(sprintf("\nERROR: %-${longest_host_len}.${longest_host_len}s - exec( ) failed: $!\n", $host));
          } else {
             # - We have the "normal" global option
             exec("/bin/sh",'-c',"($rsh $host '$opt_command' >> $stdout) 2>> $stderr") ||
                say(sprintf("\nERROR_NORMAL_1: %-${longest_host_len}.${longest_host_len}s - exec( ) failed: $!\n", $host));
          }
       }
       exit 1; # At this point, we have spawned our child
    } elsif ( $! == EAGAIN )
    {
       # Out of resources; sleep and try again
       print "*";
       sleep 5;
       redo FORK;
    } else
    {
       # Fatal error; unable to fork ERROR_FORK_1
       say(sprintf("\nERROR_FORK_1: %-${longest_host_len}.${longest_host_len}s - fork( ) failed: $!\n", $host));
       &cleanup;
       exit 1;
    } # End of if $pid = fork
 } #End of FORK:
 # Harvest some children
 &harvest;
} # End of: Process each host
```

Returning to process 300 of FIG. 3, once the commands have been executed, automated administration module 108 can attempt to harvest active child processes via the "&harvest" subroutine call (block 314) and then repeat the forking process for additional target computer systems in the hosts array. Once all of the target computer systems in the hosts array have been processed, the FOR loop can end (block 316).

The harvesting process at block 314 can include looping through the existing child processes and determining whether any of the processes have died or have been alive for a period of time longer that the period specified by the "wait" parameter. If any of the child processes have been alive for longer that the "wait" time period, those processes can be killed. Thus, this mechanism avoids a situation where one or more child processes associated with one or more target computer systems can "hang" and thereby delay the execution of commands against other target computer systems. Once a number of child processes have been harvested (i.e., determined to have died or killed), that number can be returned to the main program to enable the forking of new child processes. The following is a section of Perl code that may be used by automated administration module 108 for carrying out the "harvest" subroutine (as well as other subroutines invoked by "harvest").

```

# Harvest some children

sub harvest( )
{
 my($num_harvested);
 # Count the number of children we harvest
 $num_harvested=0;
 # Loop until no children die
 while (1)
 {
   $pid=waitpid(-1,&WNOHANG);
   if ($pid == -1)
   {
     # No more children
     return $pid;
   } elsif ($pid == 0)
   {
     # No children died
     # This is a good time to look for children that have been running for more
     # than $opt_wait seconds, and kill them.
     if ($opt_wait > 0)
     {
       foreach $pid (keys %start_time)
       {
         # Is this PID still alive?
         if ($start_time{$pid} > 0 )
         {
           # Has the child been alive more than $opt_wait seconds?
           if (difftime(time( ),$start_time{$pid}) > $opt_wait)
           {
             signal_child($Pid);
           }
         }
       }
     }
     return $pid;
   } else
   {
     # A child died.
     # Decrement the number of active children
     --$num_children;
     say(sprintf("\n%-${longest_host_len}.${longest_host_len}s - terminated; %d left ",
       $hostname{$pid}, $num_children))
       if ($waiting_for_termination);
     # Count the number of children harvested
     ++$num_harvested;
     # Save this child's exit value
     $exit_value{$pid}=$?;
     # Ignore this PID in the future
     $start_time{$pid}=0;
     $percent = (($num_hosts - $num_children)/ $num_hosts) *100;
     print " <-- Section: $percent% Complete --> \r" if ($percent < 100);
     print " <-- Section: $percent% Complete -->           \n" if ($percent == 100);
   }
 }
 return $num_harvested;
}

# Send a signal to a process that has been alive too long
sub signal_child($) {
 my($pid) = @_;
 my(
   $signal,    # the signal to be sent
   $idx,       # misc. index
 );
 if (!defined($last_signal_sent{$pid})) {
   # Send the first signal
   $signal = $signals[0];
 } else {
   # A subsequent signal
   for ($idx = 0; $idx < $#signals; $idx++) {
     if ($last_signal_sent{$pid} == $signals[$idx]) {
       $signal = $signals[$idx + 1];
     }
   }
 }
 # If no signal is defined, then we've already sent the last one
 return if (!defined($signal));
 # If it's been less than 10 seconds since the last signal, return
 return if (difftime(time,$last_signal_time{$pid}) < 10);
 my ($AllProcs, @AllProcs,$ParentProc);
 $AllProcs = "ps -efa | grep $pid | grep -v grep";
 open PROCS, "$AllProcs |";
 @AllProcs = <PROCS>;
 close PROCS;
 # Kill all the children first
 for my $ProcLine ( 0 .. $#AllProcs ) {
   $ParentProc = (split / /, $AllProcs[$ProcLine])[6];
   if ( $ParentProc ) {
     if ( $ParentProc != 1 ) {
       if ( $ParentProc == $pid ) {
         #$AllProcs{ParentProc} = "$pid";
         my $Children = "Alive";
         while ( $Children eq "Alive" )
         {
           my $ChildProc = (split / /, $AllProcs[$ProcLine])[5];
           if ( $ChildProc ) {
             if ( $ChildProc != 1 ) {
               say(sprintf("\n  --(%-${Len_Count}.${Len_Count}s) %- ${longest_host_len}.${longest_host_len}s [Child] " .
                 " - kill %d %d sent; it was alive %s seconds. Timestamp: [%s]",
                 $ChildProc, difftime(time,$start_time{$pid}), scalar localtime $start_time{$pid}));
               kill ($signal, $ChildProc);
               $Children = "Killed";
             } else {
               $Children = "Root";
             }
           } else {
             $Children = "Dead";
           }
         }
       }
     }
   }
 }
 # Kill the parent
 say(sprintf("\n --(%-${Len_Count}.${Len_Count}s) %-${longest_host_len}.${longest_host_len}s [Parent] " .
   "- kill %d %d sent; it was alive %s seconds. Timestamp: [%s]",
   $Child{$pid}, $hostname{$pid}, $signal, $pid,
   difftime(time,$start_time{Spid}), scalar localtime $start_time{$pid}));
 kill ($signal, $pid);
 # Remember the last signal that was sent
 $last_signal_sent{$pid} = $signal;
 # Remember the last time we signalled
 $last_signal_time{$pid} = time;
}
```

Once all target computer systems in the hosts array have been processed per blocks 308-314, automated administration module 108 can perform additional harvesting for child processes that are still alive (block 318). This can include, for example, invoking the harvest subroutine again and providing status information to the system administrator on processes that have (or have not) terminated. The following is a section of Perl code that may be used by automated administration module 108 for carrying out this processing.

```
say("\nUpdate: Waiting for forked processes to terminate\n");
$waiting_for_termination = 1;
if (defined $opt_brief)
{
  print "- Brief option (terminate routine not displayed)\n";
} else
{
  foreach $pid (sort keys %start_time)
  {
    if ($start_time{$pid} == 0)
    {
      if ($opt_verbose)
      {
        say(sprintf("\n%-${longest_host_len}.${longest_host_len}s - already terminated ",
          $hostname{$pid}));
      } else
      {
        print "x";
      }
    }
  }
}
print "\nUpdate: Letting remaining processes finish\n";
# Harvest the children -- This is the MAIN "Guts" of the program
# - Everything is spawned and we are now harvesting sleeping children
while (1) {
  $rval = harvest();
  if ($rval == -1) {
    last;
  } elsif ($rval > 0)
  {
    if (defined $opt_brief)
    {
      print " (harvesting) ";
    } else
    {
      print_remaining_hosts();
    }
  }
  sleep 1;
}
```

At block 320, automated administration module 108 can aggregate the output and error information from all of the individual "stdout" and "stderr" log files created by each child process into a single "stdout" file and a single "stderr" file. Module 108 can then perform various cleanup operations (e.g., delete temporary files, etc.), print out further status information to the system administrator, and exit. The following is a section of Perl code that may be used by automated administration module 108 for carrying out this processing.

```
&write_results;
&cleanup;
$StopTime = time();
$StopDate = scalar localtime;
$ElapsedTime = difftime($StopTime,$StartTime);
$|=1;
print " ";
say ("\n -Started: $StartDate \n -Finished:$StopDate\n -Elapsed: $ElapsedTime seconds\n");
# All done.
exit 0;

# END: MAIN PROGRAM
```

```
##################

# Remove temp files, etc.

sub cleanup() {
  rmtree($temp_dir, 0, 0);
# ;;
}

# Find a file in the PATH and return its location

sub find_in_path($) {
  my($file)=@_;
  my(@dirs,$dir);
  my($path);
  @dirs=split /:/, $ENV{PATH};
  foreach $dir (@dirs) {
    $path="$dir/$file";     #" Annoying
    if (-f $path) {
      return $path;
    }
  }
  return undef;
}

# Write the stderr and stdout to files

sub write_results()
{
  #stack_trace();
  say("\n");
  # Let's open up the stdout file for writing
  if (defined $opt_prefix) {
    say("Writing $opt_prefix.stdout\n");
    open FILE, "> $opt_prefix.stdout" or die "Can't open stdout file: $!\n";
  }
  # Process the stdout files in the order their process was forked
  $cnt = 1;
  my $out_cnt = 0;
  $percent = 0;
  foreach $pid (sort numerically keys %fork_order)
  {
    $percent = ($cnt/$num_hosts) *100;
    print " <-- Section: $percent% written (adding $out_cnt hosts to *.stdout) --> \r" if ($percent < 100);
    print " <-- Section: $percent% written (adding $out_cnt hosts to *.stdout)-->            \n\n" if ($percent == 100);
    $cnt++;
    # Should we append the (child's stdout) to the (prefix stdout)?
    if ($opt_long || (-s $stdout{$pid} > $stdout_sizes{$pid}))
    {
      $out_cnt++;
      # Should this file be written? (only if it's increased in size)
      open OUT, "$stdout{$pid}" or die "ERROR: Can't open stdout file for $hostname{$pid}: $!\n";
      push (@completed_hosts, $hostname{$pid});
      # If the "-1" (or single) option was selected
      if ($opt_single)
      {
        # Only print the first line of the actual output
        my $line_number_value = 0;
        while (<OUT>)
        {
          $line_number_value++;
          if ($line_number_value == 1 )
          {
            print FILE $_ if (defined $opt_prefix);
            last;
          }
        }
      } else
      {
        # Print the entire contents to prefix/stdout file
        while (<OUT>)
        {
          print FILE $_ if (defined $opt_prefix);
        }
      }
```

-continued

```
        close OUT;
        $stderr_sizes{$pid} = $stderr_sizes{$pid} + 1;
        undef $exit_value{$pid};
        print FILE "(Executed_No_Output)\n" if (-s $stdout{$pid} ==
$stdout_sizes{$pid} && defined($opt_prefix));
      }
   }
   close FILE if (defined $opt_prefix);
   print "\n --- *.stdout section: Contains $out_cnt OUT hosts --- \n\n";
   # Should we write the stderr to a file?
   #
   if (defined $opt_prefix)
   {
      say("Writing $opt_prefix.stderr\n");
      open FILE, "> $opt_prefix.stderr" or die "ERROR: Can't open stderr
file: $!\n";
   }
   # Process the stderr files in the order their process was forked
   $cnt = 1;
   $percent = 0;
   my $err_cnt = 0;
   foreach $pid (sort numerically keys %fork_order)
   {
      $percent = ($cnt/$num_hosts) *100;
      print " <-- Section: $percent% Complete (adding $err_cnt hosts to
*.stderr) --> \r" if ($percent < 100);
      print " <-- Section: $percent% Complete (adding $err_cnt hosts to
*.stderr) -->           \n\n" if ($percent == 100);
      $cnt++;
      # Does it exist?
      if (! defined $exit_value{$pid})
      {
         next;
      }
      # Should this file be written?
      if ($opt_long || (-s $stderr{$pid} > $stderr_sizes{$pid}) ||
         (defined($exit_value{$pid}) && $exit_value{$pid} > 0))
      {
         $err_cnt++;
         print " <-- Section: $percent% Complete (adding $err_cnt hosts to
*.stderr) --> \r";
         push (@completed_hosts, $hostname{$pid});
         open OUT, "$stderr{$pid}" or die "ERROR: Can't open stderr file
for $hostname{$pid}: $!\n";
         while (<OUT>)
         {
            if (defined $exit_value{$pid})
            {
               if ($exit_value{$pid} > 0)
               {
                  if (defined $opt_prefix)
                  {
                     print FILE $_;
                  }
               }
            }
         }
         if ((defined $opt_prefix) && ($exit_value{$pid} > 0))
         {
            print FILE "#-Exit value from $rsh for $hostname{$pid} was
$exit_value{$pid}\n";
            print FILE "\n";
         }
         close OUT;
      }
   }
   close FILE if (defined $opt_prefix);
   print "\n --- *.stderr section: Contains $err_cnt ERROR hosts --- \n\n";
   # Should we write the stdbad to a file?
   #
   if (defined $opt_prefix)
   {
      say("Writing $opt_prefix.stdbad\n");
      open FILE, ">> $opt_prefix.stdbad" or die "ERROR: Can't open
stdbad file: $!\n";
   }
   # Process the stbad items
   # - Basically, anything not in @completed_hosts (from @hosts) is
BAD - at this point
   $cnt = 1;
   $percent = 0;
   foreach $host (@hosts)
   {
      $percent = ($cnt/$num_hosts) *100;
      print " <-- Section: $percent% Complete (adding $bad_cnt hosts to
*.stdbad) --> \r" if ($percent < 100);
      print " <-- Section: $percent% Complete (adding $bad_cnt hosts to
*.stdbad) -->           \n\n" if ($percent == 100);
      $cnt++;
      chomp $host;
      $bad_cnt++ unless grep ( /$host/, @completed_hosts);
      print FILE "# $host  -  FAILED TO REPORT BACK IN\n" unless
grep ( /$host/, @completed_hosts);
   }
   close FILE if (defined $opt_prefix);
   print "   --- *.stdbad section: Contains $bad_cnt BAD hosts  --- \n\n";
   #   print ("COMPLETED_HOSTS:\n@completed_hosts\n");
   #   print ("HOSTS:\n@hosts\n\n");
}
```

It should be appreciated that the processes described above with respect to FIGS. 3-7 are illustrative and that variations and modifications are possible. Steps described as sequential can be executed in parallel, order of steps can be varied, and steps can be modified, combined, added, or omitted. Further, it should be appreciated that the code samples above are merely provided for purposes of illustration and should not be construed as limiting embodiments of the present invention. One of ordinary skill in the art would recognize many variations, modifications, and alternatives.

The following sections provide various example command line invocations of automated administration module 108, along with a brief description of what is executed as a result of each invocation and an explanation of the specified command line parameters. In these examples, module 108 is referred to using the name "me," but any other name may also be used.

```
$me -1 -v -y
Execute: "uptime" against a list of hosts. Using defaults.
   -1 Single line. We want a single line of output per host
   -v Verbose. We want to see how many are left to process
   -y Auto-Yes. We don't want to give confirmation to run on each host
      The options below are taken as defaults
   *The options below are set to their defaults*
   -c "/usr/bin/uptime" Command shows how long the client has been up
   -e /usr/bin/rsh
   -f 500 We limit the number of forks to 500 hosts at a time
   -h "./HOSTS" Where we get the list of clients
   -p "./RESULTS" Store results in RESULTS.std[out|err|bad]
   -t "/tmp" The temp dir to place temp files
   -w 60 Let's wait for 60 seconds before killing a client
   -r 3 We only ping the host three times
$me -1 -v -y -c "ypwhich" -f 100 -h "/tmp/hosts" -p "/tmp/results" -w 30
Execute: "ypwhich" against a list of hosts.
   -1 Single line. We want a single line of output per host
   -v Verbose. We want to see how many are left to process
   -y Auto-Yes. We don't want to give confirmation to run on each host
      The options below are taken as defaults
   -c "ypwhich" Command shows NIS Server on the client
   -f 100 We limit the number of forks to 100 hosts at a time
   -h "/tmp/hosts" Where we get the list of clients
   -p "/tmp/results" Store results in RESULTS.std[out|err|bad]
   -w 30 Let's wait for 30 seconds before killing a client
   *The options below are set to their defaults*
   -e /usr/bin/rsh
   -t "/tmp" The temp dir to place temp files
   -r 3 We only ping the host three times
$me -1 -v -y -c "date;time /usr/local/writeable/My_Script.sh;date" -w 120
Execute: "/usr/local/writeable/My_Script.sh" against a list of hosts.
   -1 Single line. We want a single line of output per host
   -v Verbose. We want to see how many are left to process
   -y Auto-Yes. We don't want to give confirmation to run on each host
```

-continued

```
The options below are taken as defaults
-c "date;time My_Script.sh;date" does some work
-w 120 Let's wait for 120 seconds before killing a client
*The options below are set to their defaults*
-e /usr/bin/rsh is used
-f 500 We limit the number of forks to 500 hosts at a time
-h "./HOSTS" Where we get the list of clients
-p "./RESULTS" Store results in RESULTS.std[out|err|bad]
-t "/tmp" The temp dir to place temp files
-w 60 Let's wait for 60 seconds before killing a client
-r 3 We only ping the host three times
$me -1 -v -y -c "./script.sh" -z -a "-option" -t "/private"
Example: (Local-ly) This will run the script "local-ly"
  (This would do: ./script -option <Host>) - keeping temp files in /private
  This is used if you want to run the script many times on the
  trusted host.
$me -y -f 1 -w 30 -h Hosts -p Hosts -c "/path_to/script.sh -i Files.Tar
Example: (Global - Include Option)
  This will run the script "global-ly":
  -- It first copies the "Files.tar" file to "Host:/tmp/Files.tar"
  -- It then rsh'es to the Host and executes the "/path_to/script.sh"
    command
  -- You can know have the "script.sh" use the "Files.tar"
$me -y -f 1 -w 30 -h Hosts -p Hosts -c Script.sh -i Files.tar -q
Example: (Global - Enscorse Option)
Special Case (-q -Embody option): (Only Copy Items to Hosts)
  (This would copy Files.tar and Script.sh to the remote Hosts directory:
  /tmp/Files.tar and /tmp/Script.sh
  ***Do not include the leading ./ in the -c or -i options !!!
  -- Only use this to copy Files.tar and Script.sh to the Hosts
  -- You can then use doit to run the Script.sh
```

Although specific embodiments of the invention have been described above, various modifications, alterations, alternative constructions, and equivalents are within the scope of the invention. For example, although embodiments of the present invention have been described with respect to certain flow diagrams and steps, it should be apparent to those skilled in the art that the scope of the present invention is not limited to the described diagrams/steps.

Further, although embodiments of the present invention have been described using a particular combination of hardware and software, it should be recognized that other combinations of hardware and software are also within the scope of the present invention.

The specification and drawings are, accordingly, to be regarded in an illustrative rather than restrictive sense. It will be evident that additions, subtractions, and other modifications may be made thereunto without departing from the broader spirit and scope of the invention as set forth in the following claims.

What is claimed is:

1. A method, comprising:
   receiving, by an administrator computer system, a plurality of input parameters including a first parameter specifying a plurality of target computer systems, a second parameter specifying a command to be executed against the plurality of target computer systems, and a third parameter specifying a total number of child processes that can be active at once for executing the command in parallel against a subset of the plurality of target computer systems;
   validating, by the administrator computer system, the plurality of input parameters by providing a ping to the plurality of target computer systems;
   subsequently to the validating, causing, by the administrator computer system, the command to be automatically executed in parallel against the subset of the plurality of target computer systems, the subset comprising each target of the plurality of target computer systems that replied to the ping;
   storing, by the administrator computer system, output information and first error information generated as a result of the command execution; and
   storing, by the administrator computer system, second error information generated as a result of the receiving, validating, and causing, the second error information being distinct from the first error information, wherein causing the command to be automatically executed in parallel against the subset of the plurality of target computer systems further comprises, for each target of the subset:
      determining whether a current number of active child processes meets or exceeds the total number of child processes that can be active at once; and
      if the current number does not meet or exceed the total number:
         forking a new child process for the target of the subset; and
         executing the command against the target of the subset in the context of the new child process.

2. The method of claim 1, wherein the output information, the first error information, and the second error information are stored in first, second, and third log files respectively, the first, second, and third log files being distinct from each other.

3. The method of claim 2, wherein the plurality of input parameters further include a fourth parameter specifying a directory for storing the first, second and third log files.

4. The method of claim 1, wherein the plurality of input parameters further include: a fourth parameter specifying a period to wait prior to killing existing child processes, a fifth parameter specifying one or more arguments to be used by the command, or a sixth parameter specifying one or more files to be copied over to each target of the plurality of target computer systems.

5. The method of claim 1, wherein validating the plurality of input parameters comprises:
   determining whether the first parameter specifies a validly formed file or list of target computer systems; and
   if the first parameter does not specify a validly formed file or list, generating an error to be included in the second error information.

6. The method of claim 1, wherein causing the command to be automatically executed in parallel against the subset of the plurality of target computer systems comprises, for each target computer system of the plurality of target computer systems, validating a status of the target computer system.

7. The method of claim 6, further comprising:
   if a reply to the ping is not received from a particular target computer system of the plurality of target computers, determining whether a maximum number of retries have been attempted; and
   if the maximum number of retries have been attempted:
      generating an error to be included in the second error information; and
      skipping the particular target computer system, such that the command is not caused to be executed against the particular target computer system.

8. The method of claim 7, wherein if the maximum number of retries has not been attempted, another attempt is made to ping the particular target computer system.

9. The method of claim 7, wherein the maximum number of retries is based on a fourth parameter included in the plurality of input parameters.

10. The method of claim 6, wherein if the current number meets or exceeds the maximum number, the method further comprises:
    sleeping for a period of time; and
    harvesting one or more active child processes.

11. The method of claim 6, where the maximum number of active child processes is based on a fourth parameter included in the plurality of input parameters.

12. The method of claim 6, wherein executing the command against the target of the subset in the context of the new child process comprises:
    determining whether the command should be executed locally or globally;
    if the command should be executed locally, executing the command on the administrator computer system; and
    if the command should be executed globally:
        logging into the target of the subset; and
        executing the command on the target of the subset.

13. The method of claim 12, wherein the determination of whether the command should be executed locally or globally is based on a fourth parameter included in the plurality of input parameters.

14. The method of claim 1, wherein the plurality of target computer systems includes more than ten thousand target computer systems.

15. The method of claim 1, wherein the second parameter specifies a UNIX command.

16. The method of claim 1, wherein the second parameter specifies a multi-part command.

17. A non-transitory computer readable storage medium having stored thereon program code executable by a computer system, the program code comprising:
    code that causes the computer system to receive a plurality of input parameters including a first parameter specifying a plurality of target computer systems, a second parameter specifying a command to be executed against the plurality of target computer systems, and a third parameter specifying a total number of child processes that can be active at once for executing the command in parallel against a subset of the plurality of target computer systems;
    code that causes the computer system to validate the plurality of input parameters by providing a ping to the plurality of target computer systems;
    subsequently to the validating, code that causes the computer system to execute the command in parallel against at least the subset of the plurality of target computer systems, the subset comprising each target of the plurality of target computer systems that replied to the ping;
    code that causes the computer system to store output information and first error information generated as a result of the command execution; and
    code that causes the computer system to store second error information generated as a result of executing the program code, the second error information being distinct from the first error information, wherein executing the command in parallel against at least the subset of the plurality of target computer systems further comprises, for each target of the subset:
    determining whether a current number of active child processes meets or exceeds the total number of child processes that can be active at once; and
    if the current number does not meet or exceed the total number:
        forking a new child process for the target of the subset; and
        executing the command against the target of the subset in the context of the new child process.

18. A computer system, comprising:
    an interface configured to communicatively couple the computer system with a plurality of target computer systems;
    a memory configured to store instructions; and
    a processor communicatively coupled to the memory and configured to execute the instructions to:
        receive a plurality of input parameters including a first parameter specifying one or more target computer systems in the plurality of target computer systems, a second parameter specifying a command to be executed against the one or more target computer systems, and a third parameter specifying a total number of child processes that can be active at once for executing the command in parallel against a subset of the plurality of target computer systems;
        validate the plurality of input parameters by providing a ping to the one or more target computer systems;
        subsequently to the validating, cause the command to be automatically executed in parallel against at least the subset of the one or more target computer systems, the subset comprising each target of the one or more target computer systems that replied to the ping;
        store output information and first error information generated as a result of the command execution; and
        store second error information generated as a result of the receiving, validating, and causing, the second error information being distinct from the first error information, wherein causing the command to be automatically executed in parallel against at least the subset of the one or more target computer systems further comprises, for each target of the subset:
        determining whether a current number of active child processes meets or exceeds the total number of child processes that can be active at once; and
        if the current number does not meet or exceed the total number:
            forking a new child process for the target of the subset; and
            executing the command against the target of the subset in the context of the new child process.

* * * * *